(12) United States Patent
Lindén et al.

(10) Patent No.: US 10,091,946 B2
(45) Date of Patent: Oct. 9, 2018

(54) PRUNING SHEARS

(71) Applicant: Fiskars Finland Oy Ab, Helsinki (FI)

(72) Inventors: Olavi Lindén, Helsinki (FI); Jan Lindén, Helsinki (FI)

(73) Assignee: Fiskars Finland Oy Ab, Helsinki (FI)

( * ) Notice: Subject to any disclaimer, the term of this patent is extended or adjusted under 35 U.S.C. 154(b) by 46 days.

(21) Appl. No.: 15/276,128

(22) Filed: Sep. 26, 2016

(65) Prior Publication Data

US 2017/0099780 A1 Apr. 13, 2017

(30) Foreign Application Priority Data

Oct. 13, 2015 (FI) ...................................... 20155719

(51) Int. Cl.
*A01G 3/025* (2006.01)
*B26B 13/26* (2006.01)
*B26B 17/02* (2006.01)

(52) U.S. Cl.
CPC .................................. *A01G 3/0255* (2013.01)

(58) Field of Classification Search
CPC .......... A01G 3/025; B26B 13/26; B26B 17/02
USPC ......................................... 30/296.1, 244–248
See application file for complete search history.

(56) References Cited

U.S. PATENT DOCUMENTS

| 107,577 A | 9/1870 | Will |
|---|---|---|
| 157,610 A | 12/1874 | King |
| 476,459 A | 6/1892 | Hamann et al. |
| 573,548 A | 12/1896 | Sours |
| 640,257 A | 1/1900 | Baer |
| 823,367 A | 6/1906 | Ryan |
| 863,111 A | 8/1907 | Smohl |
| 1,066,675 A | 7/1913 | Stowell |
| 1,168,125 A | 1/1916 | Stowell |
| 1,429,792 A | 9/1922 | Stiriss |
| 1,455,297 A | 5/1923 | Lyons et al. |
| 1,502,191 A | 7/1924 | Helwig |
| 1,689,648 A | 10/1928 | Voleske |

(Continued)

FOREIGN PATENT DOCUMENTS

| EP | 0 747 181 | 12/1996 |
|---|---|---|
| EP | 0 895 712 A1 | 2/1999 |

(Continued)

OTHER PUBLICATIONS

Extended European Search Report, EP 16193480.7, Fiskars Finland Oy Ab, 7 pages (dated Feb. 28, 2017).

(Continued)

*Primary Examiner* — Sean Michalski
*Assistant Examiner* — Fernando Ayala
(74) *Attorney, Agent, or Firm* — Foley & Lardner LLP

(57) ABSTRACT

Pruning shears include a cutting head with a spring-biased blade pivotally connected to a jaw and arranged to sever a workpiece received in a bight formed by the jaw. A drive mechanism is connected to the cutting head and an elongate housing is connected to the drive mechanism. The drive mechanism includes a rotation preventer for preventing rotation of a second pulley in relation to the drive mechanism when a drawing torque is applied to the second pulley. The drawing torque is greater than a threshold torque, resulting in a second pulley being stationary in relation to the drive mechanism and the first pulley rotating in relation to the drive mechanism.

17 Claims, 11 Drawing Sheets

(56) References Cited

U.S. PATENT DOCUMENTS

| | | | |
|---|---|---|---|
| 1,760,627 A | 5/1930 | Bernard | |
| 1,897,532 A | 2/1933 | Pilcher | |
| 2,516,946 A | 8/1950 | Barone | |
| 4,130,938 A | 12/1978 | Uhlmann | |
| 4,599,795 A | 7/1986 | Yokoyama | |
| 4,677,748 A | 7/1987 | Kobayashi | |
| 5,241,752 A * | 9/1993 | Lutzke | A01G 3/08 30/249 |
| 6,345,446 B1 | 2/2002 | Huang | |
| 6,526,664 B2 | 3/2003 | Cech | |
| 6,829,829 B1 | 12/2004 | Huang | |
| 6,935,031 B1 | 8/2005 | Huang | |
| 6,938,346 B1 | 9/2005 | Huang | |
| 7,127,819 B1 | 10/2006 | Huang | |
| 7,530,172 B1 | 5/2009 | Wu | |
| 8,220,163 B2 | 7/2012 | Linden et al. | |
| 2001/0005941 A1 | 7/2001 | Dimatteo et al. | |
| 2002/0162227 A1 * | 11/2002 | Cech | A01G 3/08 30/249 |
| 2006/0156554 A1 | 7/2006 | Lin | |
| 2008/0052916 A1 | 3/2008 | Lin | |
| 2008/0155835 A1 | 7/2008 | Lin | |
| 2008/0282549 A1 | 11/2008 | Lin | |
| 2009/0038162 A1 | 2/2009 | Shan | |
| 2010/0043237 A1 | 2/2010 | Linden et al. | |
| 2010/0043238 A1 | 2/2010 | Linden et al. | |
| 2010/0162575 A1 | 7/2010 | Lin | |
| 2010/0192385 A1 * | 8/2010 | Pittau | A01G 3/0255 30/249 |
| 2010/0199502 A1 | 8/2010 | Linden et al. | |
| 2013/0099186 A1 * | 4/2013 | Kommer | B66D 3/10 254/391 |
| 2014/0008593 A1 * | 1/2014 | Kingery | B66D 3/02 254/376 |

FOREIGN PATENT DOCUMENTS

| | | |
|---|---|---|
| EP | 0895712 A1 | 2/1999 |
| EP | 1 153 713 | 11/2001 |
| EP | 1 166 620 | 1/2002 |
| EP | 2 022 320 A1 | 2/2009 |
| EP | 2 156 730 | 2/2010 |
| EP | 2 156 731 | 2/2010 |
| EP | 2 319 295 A1 | 5/2011 |
| FI | 120140 B | 7/2009 |
| GB | 2 468 665 | 9/2010 |
| JP | 08-331979 | 12/1996 |
| JP | 11-057243 | 3/1999 |
| JP | 2002-066168 | 3/2002 |

OTHER PUBLICATIONS

Finnish Search Report, App. No. 20155719, Fiskars Finland Oy Ab, 1 page (dated Jun. 3, 2016).

* cited by examiner

PRUNING SHEARS

CROSS-REFERENCE TO RELATED APPLICATIONS

This Application claims the benefit of and priority to Finnish Patent Application No. 20155719, filed Oct. 13, 2015, which is incorporated by reference herein in its entirety.

FIELD

The present invention relates to garden tools, and more particularly to pruning shears.

BACKGROUND

Document EP 0 895 712 B1 discloses a lopper used to perform lopping, pruning and similar operations includes a lopping head provided with a spring-biased blade cooperating with a jaw, a drive mechanism, and an elongate housing. The drive mechanism includes first and second wheels rotatable relative thereto about a first axis. A head line couples the first wheel to the blade at a connecting point, and the second wheel is coupled to a driving line. The first wheel is eccentric relative to the second wheel so that a distance separating a region of a guiding surface of the first wheel from the first axis is smallest at a predetermined point of blade travel across the bight. The lopper also includes an intermediate handle and a lower handle selectively operable to actuate the blade relative to the jaw.

A problem with the lopper of the document is that the pull stroke of the handles is always the same length. A thin twig requires the same length of stroke as a thick branch, and therefore an excess work is needed when a lot of thin twigs need to be cut. If the mechanical advantage of the drive mechanism was made smaller for providing a shorter length of stroke, more force would be needed for cutting the branch.

BRIEF DESCRIPTION

An object of the present invention is to provide pruning shears so as to solve the above problem.

The objects of the invention are achieved by pruning shears which is characterized by what is stated in the independent claim. The preferred embodiments of the invention are disclosed in the dependent claims.

The invention is based on the idea of providing the drive mechanism of the pruning shears with two different mechanical advantages, having the smaller mechanical advantage in use when there is no cutting resistance to the blade, and having automatic toggling means for toggling the larger mechanical advantage, when the blade contacts with a branch.

An advantage of the pruning shears of the invention is that the mechanical advantage of the drive mechanism is small when there is no cutting resistance to the blade, thus providing short stroke distance, and large when the branch is contacted, thus providing more cutting power. The cutting is divided in two modes: 1) rapid movement of blade until it hits the branch, short stroke of the pull handle; and 2) slow movement of blade, long stroke of the pull handle.

In this way a long idle stroke of the handles is avoided when thin branches are cut and the movements of the user are optimized.

BRIEF DESCRIPTION OF THE DRAWINGS

In the following the invention will be described in greater detail by means of preferred embodiments with reference to the accompanying drawings, in which.

DETAILED DESCRIPTION

Figure 1:
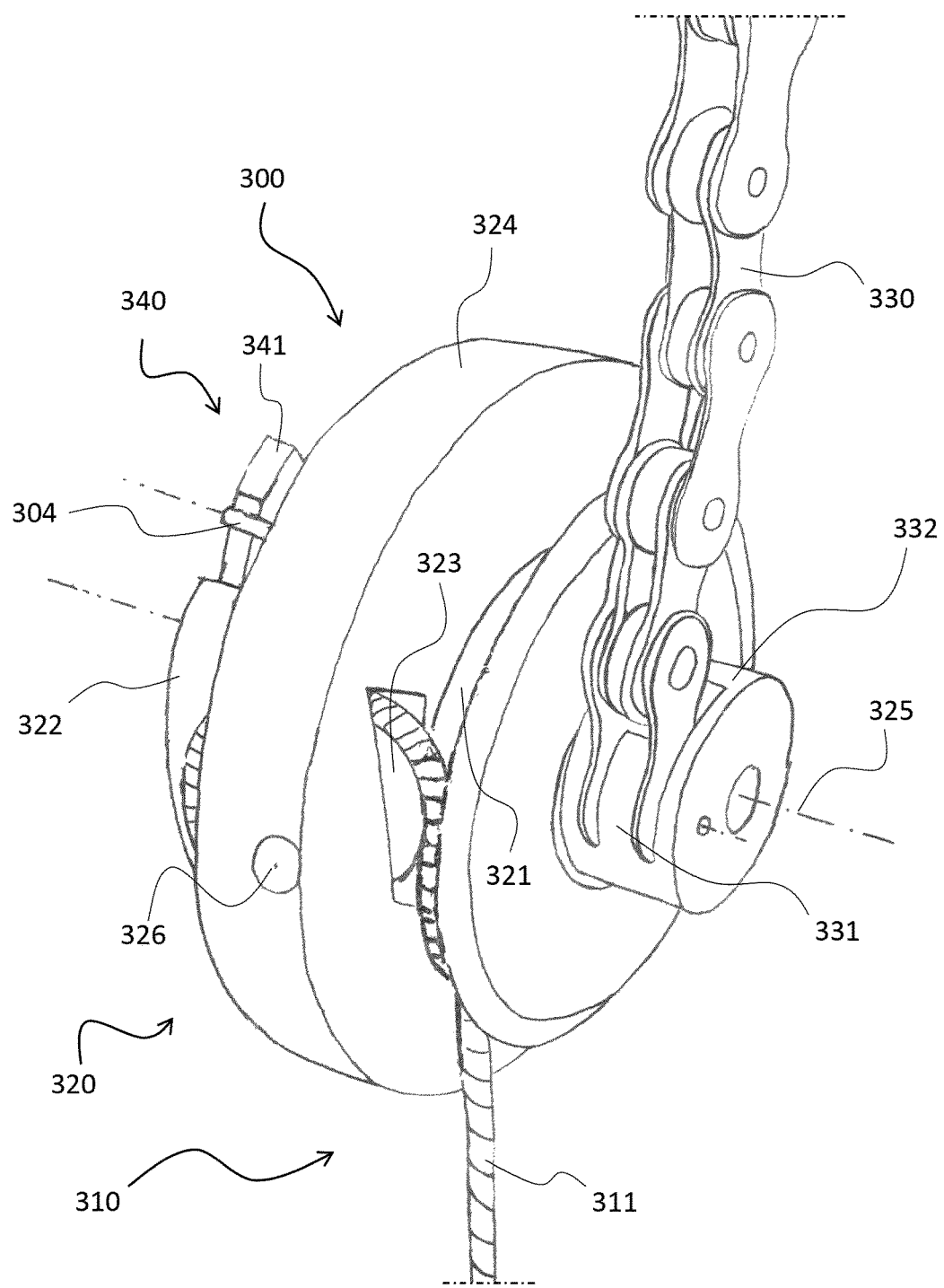
FIG. 1 shows a drive mechanism according to an embodiment of the invention.

The invention relates to pruning shears 100 comprising
a cutting head 200 with a spring-biased blade 201 pivotally connected to a jaw 202 about a pivot point 205, the jaw 202 cooperating with the blade 201 to sever a workpiece received in a bight 203 formed by the jaw 202; the spring-biased blade 201 being biased with a blade force;
a drive mechanism 300 connected to the cutting head 200; and
an elongate housing 400 connected to the drive mechanism 300;
wherein
the drive mechanism 300 comprises
a driving line arrangement 310 comprising a driving line 311; and
a tackle arrangement 320;
the tackle arrangement 320 comprises
a first pulley 321 rotatable relative to the drive mechanism 300 about an axis 325 and coupled to the blade 201;
a second pulley 322 rotatable relative to the drive mechanism 300 about the axis 325 and arranged to receive the driving line 311 at least party around the second pulley 322; and
a sheave 323 for supporting the driving line 311, the sheave 323 being arranged so that the driving line 311 runs from the second pulley 322 at least partly around the sheave 323 and at least partly around the first pulley 321;
the driving line 311 is arranged to transmit forces between the first pulley 321, the second pulley 322 and the sheave 323; and
the drive mechanism 300 comprises a rotation prevention means 340 for preventing rotation of the second pulley 322 in relation to the drive mechanism 300 when a drawing torque is applied to the second pulley 322, wherein the drawing torque is greater than a threshold torque, resulting in the second pulley 322 being stationary in relation to the drive mechanism 300 and the first pulley 321 rotating in relation to the drive mechanism 300.

In other words the tackle arrangement 320 provides the drive mechanism 300 with two different mechanical advantages by providing an automatic prevention of rotation of the second pulley 322 in relation to the drive mechanism, the prevention of rotation depending on exceeding of the threshold torque. When a drawing torque, that is greater than the blade torque but smaller than the threshold torque, is applied to the second pulley 322, the first pulley 321 and the second pulley 322 are arranged to rotate simultaneously.

The driving line is arranged to transmit the drawing torque between the first pulley 321 and the second pulley 322.

Preferably the blade 201 is biased with a blade spring 204. Preferably the driving line 311 comprises a string.

According to an embodiment the drive mechanism 300 comprises a cover 350 in connection with the cutting head 200 and the elongate housing 400, the cover 350 being provided with teeth 351 at the inner surface of the cover 350. Preferably the cover is made of plastic.

Figure 5:
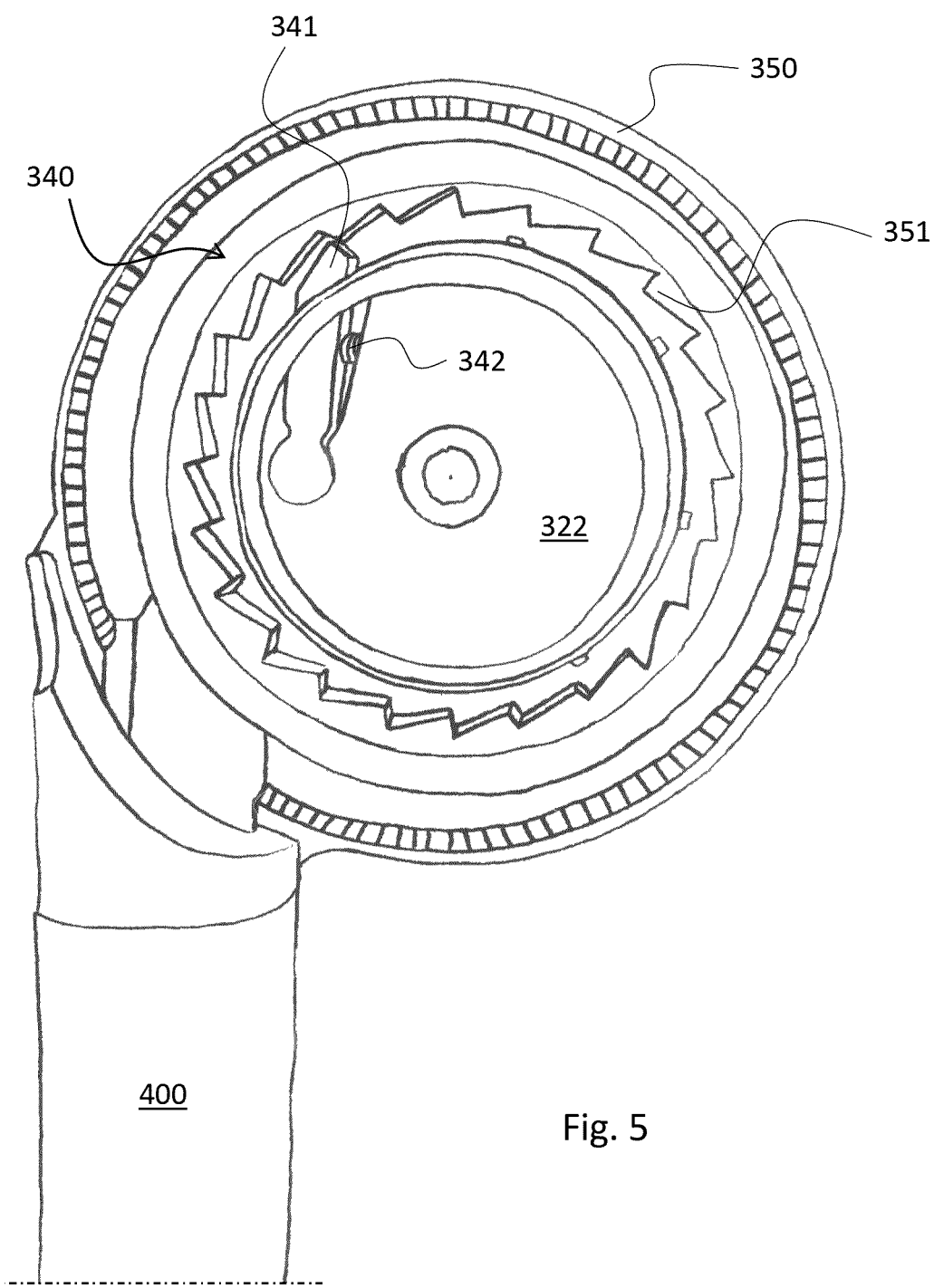
FIG. 5 shows a part of pruning shears according to an embodiment of the invention.
Figure 6:
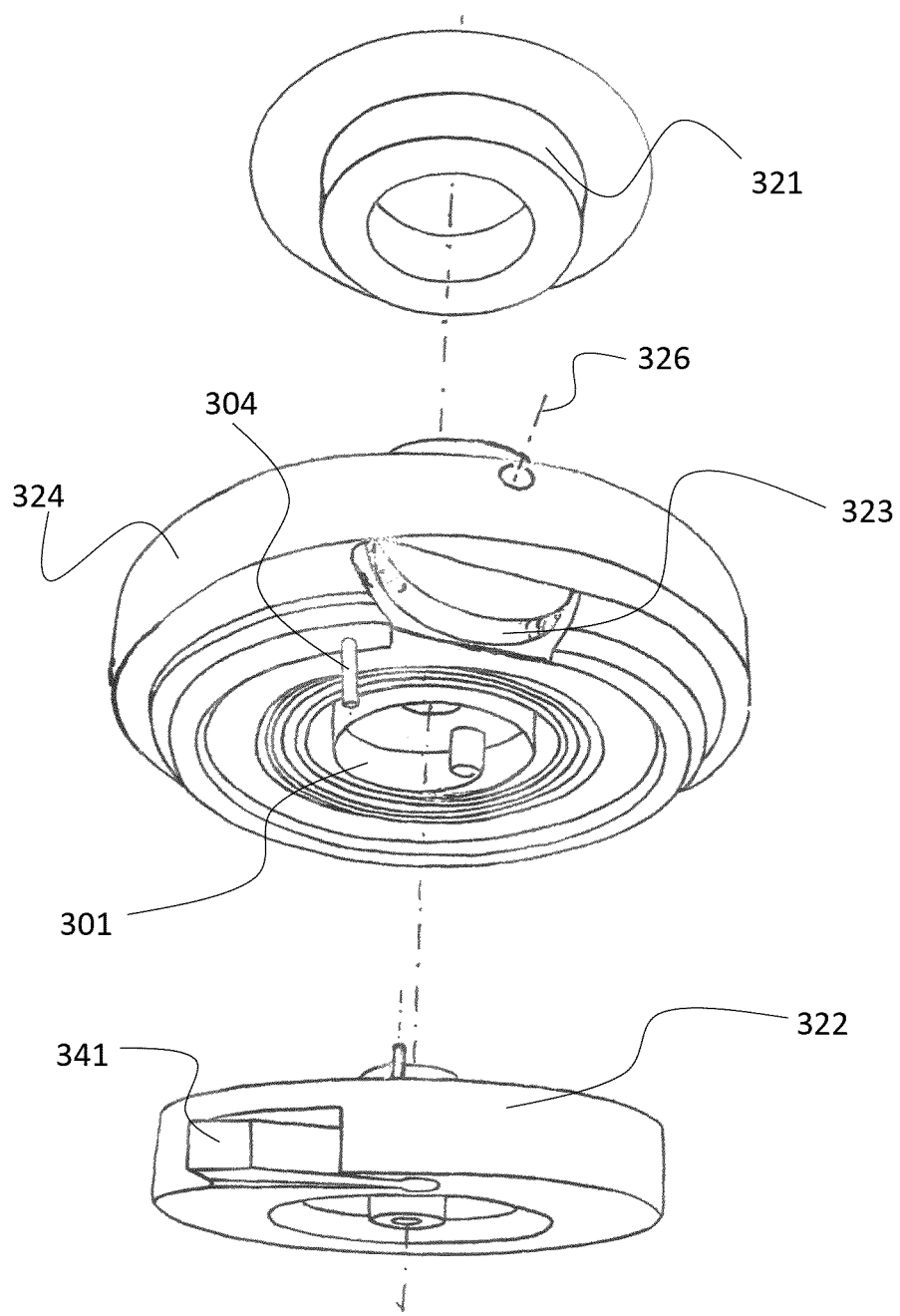
FIG. 6 shows an explosion view of a drive mechanism according to an embodiment of the invention.
Figure 7:
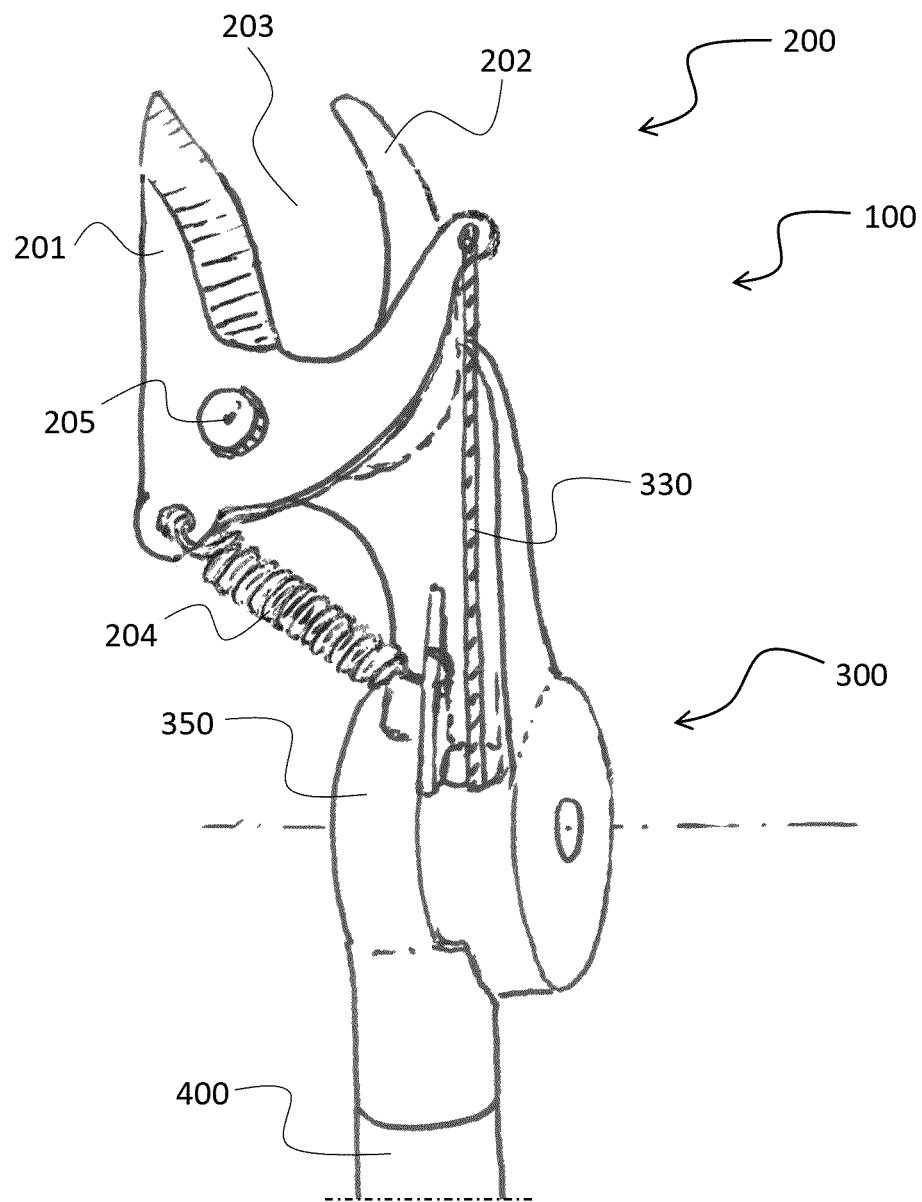
FIG. 7 shows pruning shears according to an embodiment of the invention.

According to an embodiment the rotation prevention means 340 comprises a spring loaded pawl 341 arranged at the second pulley 322, wherein the spring loaded pawl 341 is arranged to engage with one of the teeth 351 of the inner surface of the cover 350. Preferably the teeth 351 are shaped so that the teeth 351 and the spring loaded pawl 341 form a ratchet. In other words the spring loaded pawl 341 is loaded with a compression spring 324. FIG. 5 illustrates the interaction of the spring loaded pawl 341 with the teeth 351.

According to an embodiment the diameter of the first pulley 321 is smaller than the diameter of the second pulley 322. According to another embodiment the diameter of the first pulley 321 equals the diameter of the second pulley 322.

According to an embodiment the drive mechanism 300 comprises a spiral torsion spring 301 attached from one end to the second pulley 322 and coupled from the other end to the first pulley 321, wherein the spiral torsion spring 301 is prestressed with a prestress force; a prestress torque to the first pulley 321 caused by the prestress force is greater than a blade torque caused by the blade 201 force; and the prestress torque acts as the threshold torque.

Figures 12, 13:
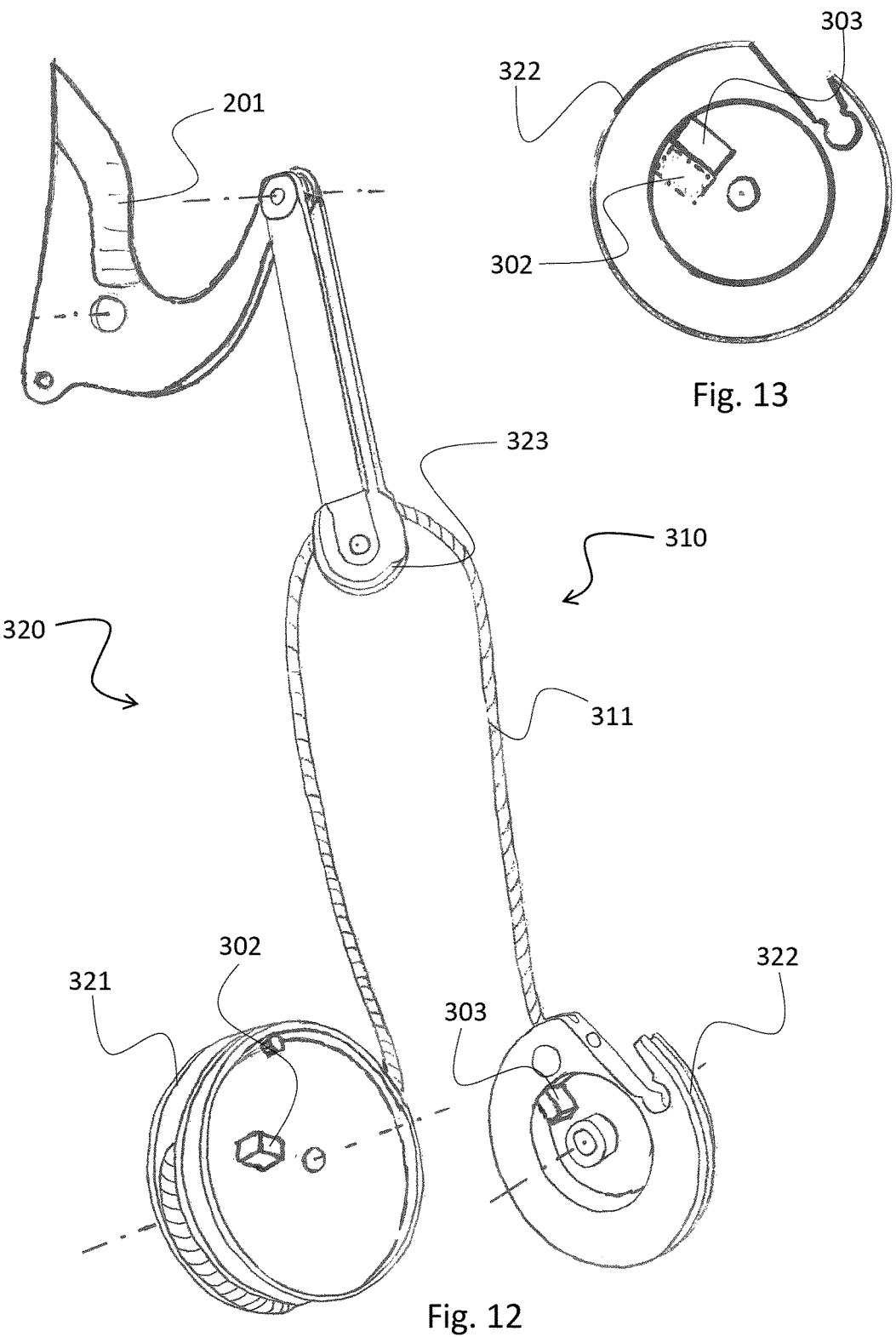
FIG. 12 shows an explosion view of a part of pruning shears according to an embodiment of the invention.
FIG. 13 shows a schematic view of a part of pruning shears according to an embodiment of the invention.

According to an embodiment the drive mechanism 300 comprises a part 302 attached to the second pulley 322, wherein the part 302 has an attractive magnetic force with a counterpart 303, wherein the counterpart 303 is coupled to the first pulley 321; a magnetic torque to the first pulley 321 caused by the magnetic force is greater than a blade torque caused by the blade force; and the magnetic torque acts as the threshold torque. In other words at least one of the part 302 and the counterpart 303 comprises a magnet that is arranged to attract the remaining part. FIGS. 12 and 13 illustrate the arrangement of the part 302 and the counterpart 303.

According to an embodiment the drive mechanism 300 comprises a support wheel 324 for supporting the sheave 323, the support wheel 324 being rotatable relative to the drive mechanism 300 about the axis 325 and arranged between the first pulley 321 and the second pulley 322, wherein the other end of the spiral torsion spring 301 has been attached to the support wheel 324;

the drive mechanism 300 comprises a stopper 304 arranged to prevent the spring loaded pawl 341 from engaging with one of the teeth 351 of the inner surface of the cover 350 when the drawing torque between the second pulley 322 and the support wheel 324 is smaller than the threshold torque, and arranged to prevent the second pulley 322 from rotating in relation to the support wheel 324 due to the prestress torque; and the sheave 323 is supported by the support wheel 324 so that it guides the driving line 311 between the first pulley 321 and the second pulley 322 so that the sheave 323 reverses the winding direction of the driving line 311 on the second pulley 322 relative to the winding direction of the driving line 311 on the first pulley 321.

According to an embodiment the drive mechanism 300 comprises a support wheel 324 for supporting the sheave 323, the support wheel 324 being rotatable relative to the drive mechanism 300 about the axis 325 and arranged between the first pulley 321 and the second pulley 322, wherein the counterpart 303 has been attached to the support wheel 324;

the drive mechanism 300 comprises a stopper 304 arranged to prevent the spring loaded pawl 341 from engaging with one of the teeth 351 of the inner surface of the cover 350 when the drawing torque between the second pulley 322 and the support wheel 324 is smaller than the threshold torque; and the sheave 323 is supported by the support wheel 324 so that it guides the driving line 311 between the first pulley 321 and the second pulley 322 so that the sheave 323 reverses the winding direction of the driving line 311 on the second pulley 322 relative to the winding direction of the driving line 311 on the first pulley 321.

Preferably the sheave 323 is supported by the support wheel 324 so that the axis 325 of the support wheel 324 forms an angle of at least 80 degrees with the axis of the sheave 323. Preferably the sheave 323 is supported by the support wheel 324 so that the sheave 323 is arranged essentially tangentially in relation to the support wheel 324.

Figure 3:
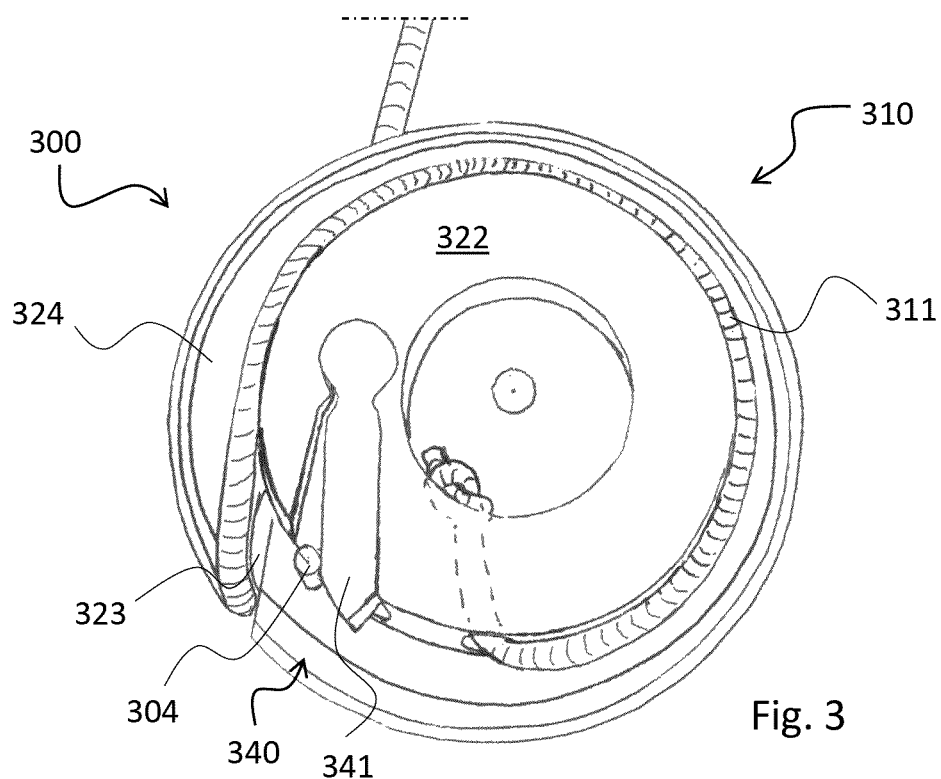
FIG. 3 shows a drive mechanism according to an embodiment of the invention.
Figure 4:
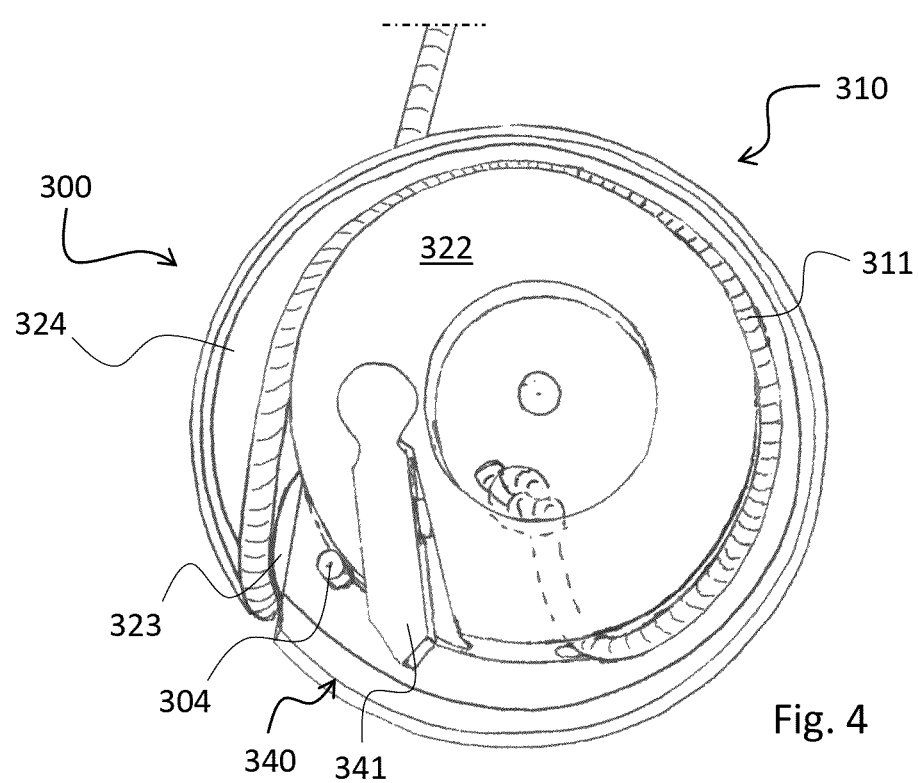
FIG. 4 shows a drive mechanism according to an embodiment of the invention.

FIGS. 3 and 4 illustrate the operation of the spring loaded pawl 341. In FIG. 3 the drawing torque does not exceed the threshold torque and thus the stopper 304 prevents the spring loaded pawl 341 from turning. In FIG. 4 the threshold torque has been exceeded so that the orientation of the second pulley 322 has changed in relation to the stopper 304 and thus the spring loaded pawl 341 has turned for engaging with one of the teeth 351.

According to an embodiment the stopper 304 is arranged at the support wheel 324. According to an embodiment the stopper is arranged at the second pulley 322 or at the spring loaded pawl 341. According to an embodiment the stopper 304 comprises a pin.

Figure 2:
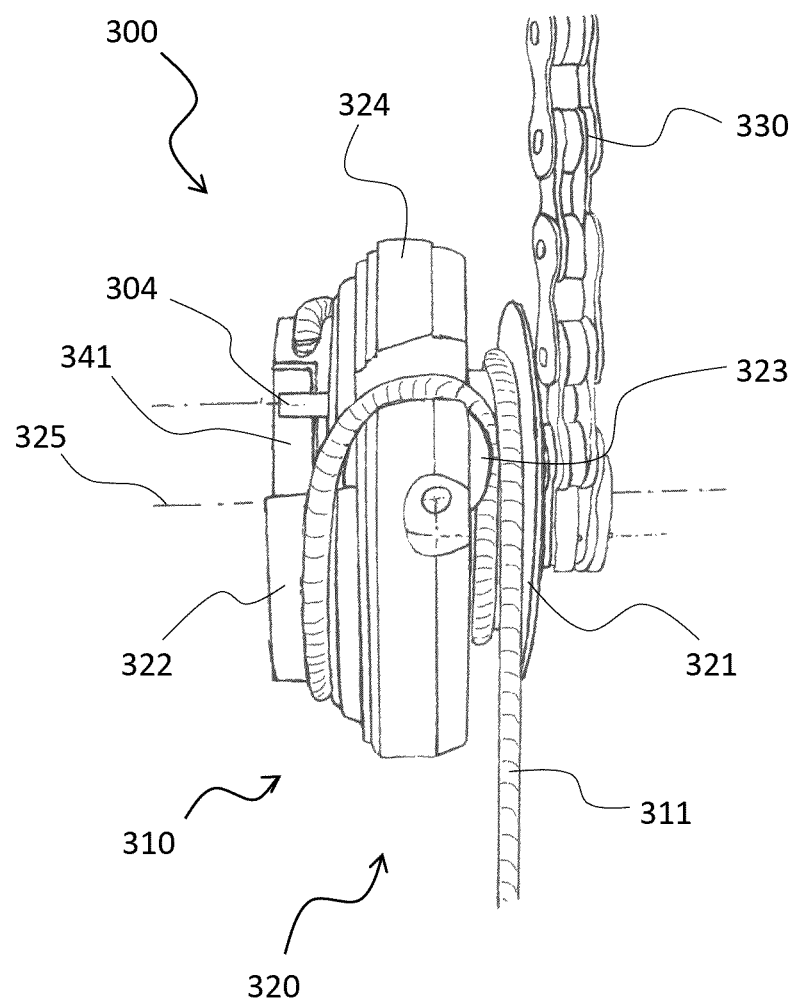
FIG. 2 shows a drive mechanism according to an embodiment of the invention.

According to an embodiment one end of the driving line 311 has been attached to the second pulley 322, wherein the driving line 311 runs counter-clockwise at least partly around the second pulley 322, via the sheave 323 and clockwise at least partly around the first pulley 321. FIG. 2 illustrates the driving line arrangement in this embodiment.

According to an embodiment the first pulley 321 is coupled to the blade 201 by a head line 330, the head line 330 being connected to the first pulley 321 at a first connecting point 331 such that the head line 330 is wound about a guiding surface 332 of the first pulley 321 as the first pulley 321 rotates about the axis 325. According to an embodiment the head line 330 comprises a chain. According to an embodiment the head line 330 comprises a string.

According to an embodiment the driving line arrangement 310 is arranged to rotate the first pulley 321 and the second pulley 322 when a drawing force is applied to the driving line 311, wherein the drawing torque is caused by the drawing force. In other words the drawing force is applied to the end of the drawing line 311 opposite the end of the drawing line 311 attached to the second pulley 322.

Alternatively the driving line 311 has been attached to the first pulley 321; and the drive mechanism 300 comprises a pull line 305 arranged to rotate the first pulley 321 when a drawing force is applied to the pull line 305, the pull line 305 being arranged to rotate the first pulley 321 in a direction where the driving line 311 is wound around the first pulley 321, wherein the drawing torque is caused by the drawing force. In other words the driving line 311 has been attached to the first pulley 321 at the end of the drawing line 311 opposite the end of the drawing line 311 attached to the second pulley 322.

FIG. 1 shows the drive mechanism 300 at the starting point, i.e. when no drawing force is applied. The head line 330 is connected to the blade 201 at the upper end. The driving line 311 is wound half a turn around the sheave 323 and a full turn around the first pulley 321 and the second pulley 322. The second pulley 322 is connected to the support wheel 324 either with a pre tensioned spiral torsion spring 301 or with the part 302 and the counterpart 303, the part 302 and the counterpart 303 having an attractive magnetic force with each other, creating the prestress torque or magnetic torque between the second pulley 322 and the support wheel 324, wherein the prestress torque or magnetic torque is slightly greater than the blade torque created by the blade spring 204 forcing the blade 201 to a starting position. The blade force from the blade spring 204 at the blade 201 is transmitted to the support wheel 324 via the head line 330 and the driving line 311. A pin acting as the stopper 304 fixed to the support wheel 324 is locking the spring loaded pawl 341 and prevents the second pulley 322 and the support wheel 324 to rotate relative to each other.

When a drawing torque is applied to the first pulley 321, for example by pulling the driving line 311, and there is no resistance from a branch, the driving line 311 is unwound from around the first pulley 321; and the first pulley 321, the support wheel 324 and the second pulley 322 are rotating together as one unit. When the blade 201 hits the branch the driving line 311 will pull the support wheel 324 and the second pulley 322 apart from their initial position relative to each other, the pin acting as the stopper 304 releases the spring loaded pawl 341 and the spring loaded pawl 341 engages with one of the teeth 351 of the cover 350, as illustrated in FIG. 5. As a result, the second pulley 322 cannot rotate and the driving line 311 is unwound from around the second pulley 322 and rotates the support wheel 324 via the sheave 323 and the first pulley 321 creating an increased force via the head line 330 to the blade 201.

In the first mode having a small mechanical advantage the diameter of the first pulley 321 determines the torque driving the head line 330. In the second mode having a large mechanical advantage the diameters of the first pulley 321 and the second pulley 322 determine the torque: the diameter of the first pulley 321 divided by two plus diameter of the sheave 323 divided by two times the tension of the driving line 311. If the diameter of the first pulley 321 and the diameter of the second pulley 322 are equal, the torque is doubled in the second mode having a large mechanical advantage compared to the first mode having a small mechanical advantage. If the proportion of the diameter of the second pulley 322 to the diameter of the first pulley 321 is 3/2 the torque in the second mode is 2.5 times the torque in the first mode. The travel of the driving line 311 in the second mode is also 2.5 times the travel of the driving line 311 in the first mode.

According to an embodiment the other end of the spiral torsion spring 301 has been attached to the first pulley 321; and the drive mechanism 300 comprises a stopper 304 arranged to prevent the spring loaded pawl 341 from engaging with the one of the teeth 351 of the inner surface of the cover 350 when the drawing torque between the first pulley 321 and the second pulley 322 is smaller than the threshold torque, and arranged to prevent the second pulley 322 from rotating in relation to the first pulley 321 due to the prestress torque.

According to an embodiment the counterpart 303 has been attached to the first pulley 321; and the drive mechanism 300 comprises a stopper 304 arranged to prevent the spring loaded pawl 341 from engaging with the one of the teeth 351 of the inner surface of the cover 350 when the drawing torque between the first pulley 321 and the second pulley 322 is smaller than the threshold torque.

According to an embodiment the stopper 304 is arranged at the first pulley 321. According to an embodiment the stopper is arranged at the second pulley 322 or at the spring loaded pawl 341. According to an embodiment the stopper 304 comprises a pin. According to an embodiment the stopper comprises a pin arranged at the spring loaded pawl 341 and the first pulley comprises a guide for interacting with the pin. The guide is shaped so that it forces the pin to retract the pawl because of the prestress torque or the magnetic torque.

According to an embodiment the sheave 323 is coupled to the blade 201; the driving line 311 has been attached to the second pulley 322; and the driving line 311 runs from the second pulley 322 at least partly around the sheave 323 and at least partly around the first pulley 321.

Figure 10:
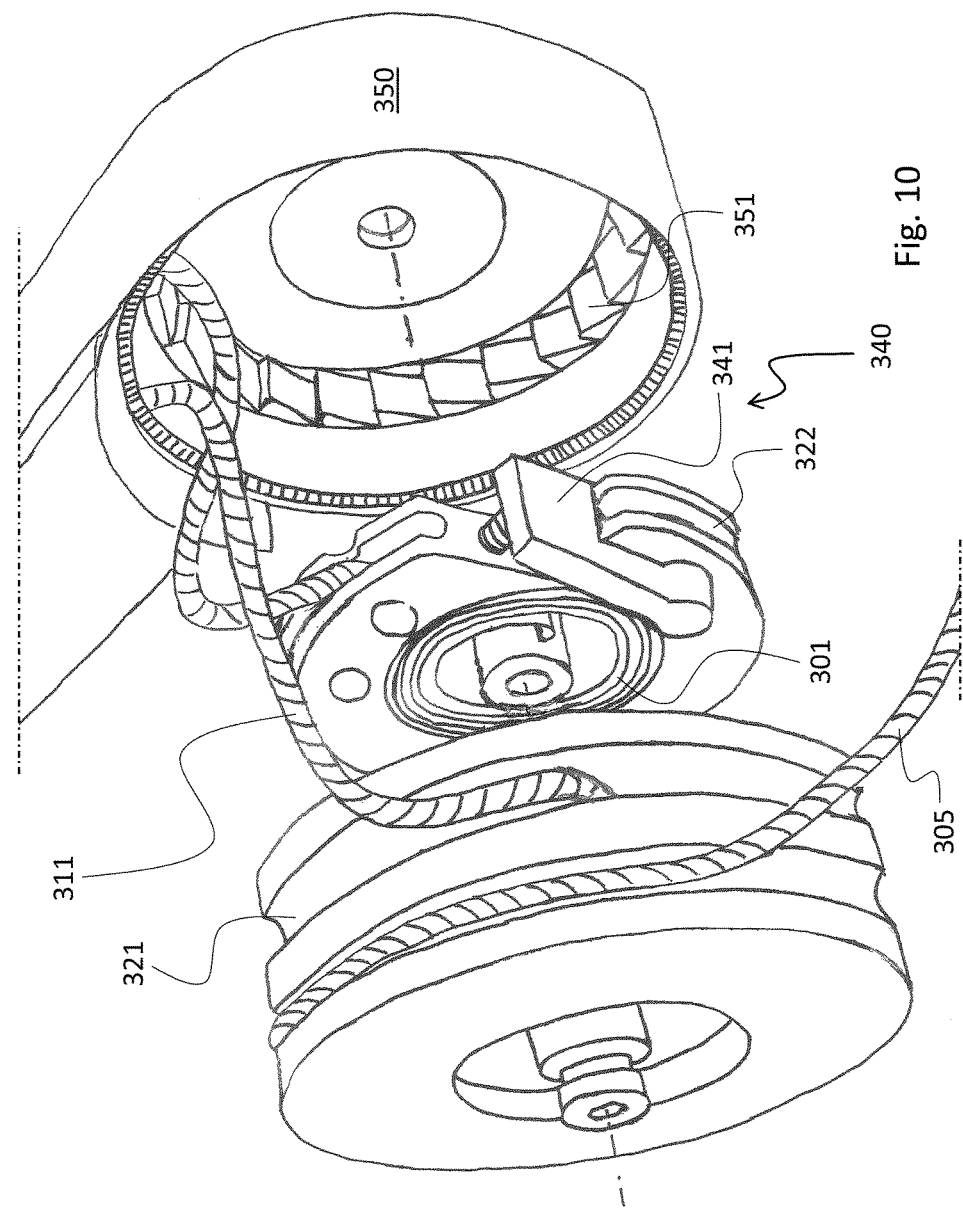
FIG. 10 shows an explosion view of a drive mechanism according to an embodiment of the invention.
Figure 11:
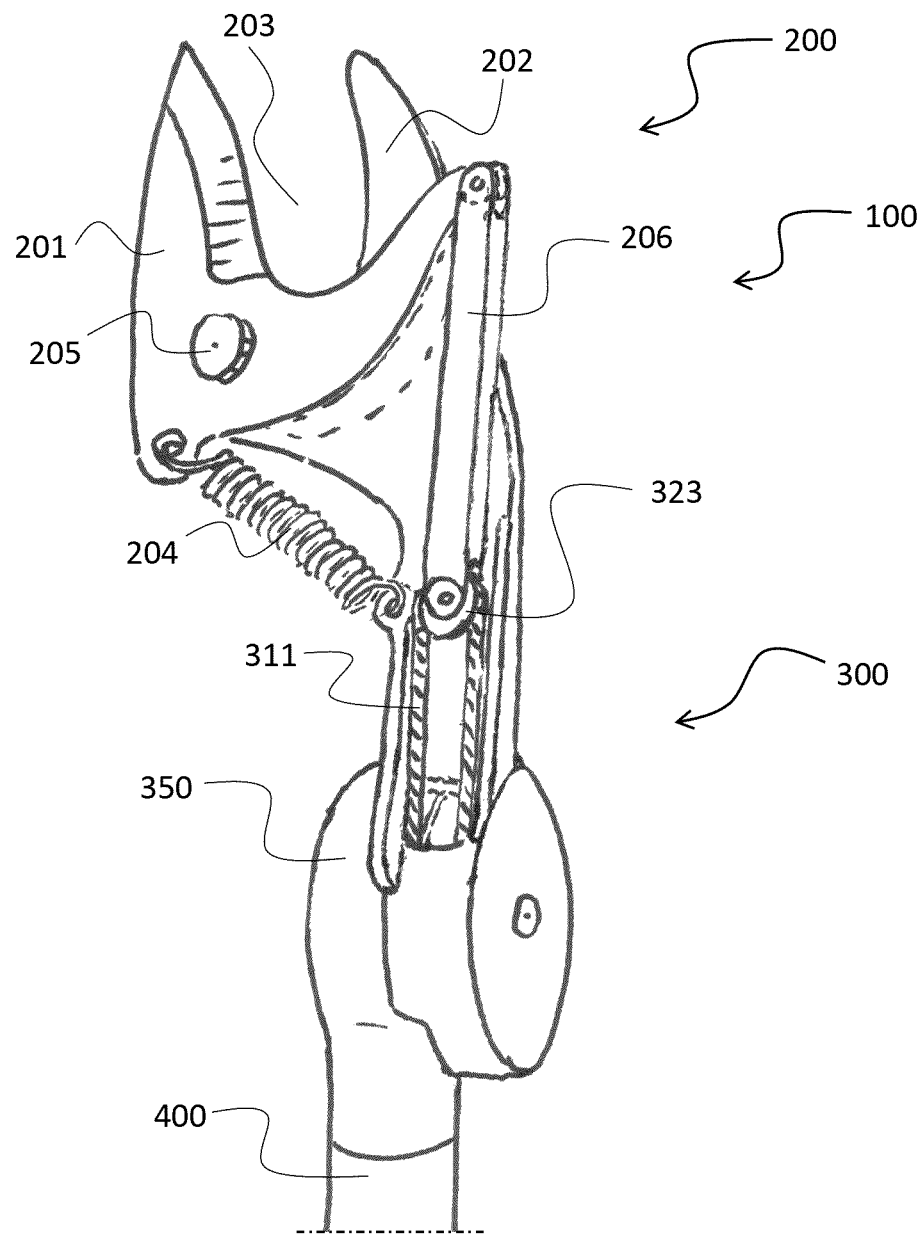
FIG. 11 shows pruning shears according to an embodiment of the invention.

According to an embodiment the driving line 311 has been attached to the first pulley 321; and the drive mechanism 300 comprises a pull line 305 arranged to rotate the first pulley 321 when a drawing force is applied to the pull line 305, the pull line 305 being arranged to rotate the first pulley 321 in a direction where the driving line 311 is wound around the first pulley 321, wherein the drawing torque is caused by the drawing force. FIG. 10 illustrates the running of the driving line 311.

Alternatively the driving line arrangement 310 is arranged to rotate the first pulley 321 and the second pulley 322 when a drawing force is applied to the driving line 311, wherein the drawing torque is caused by the drawing force. In other words the drawing force is applied to the end of the drawing line 311 opposite the end of the drawing line 311 attached to the second pulley 322.

Figure 8:
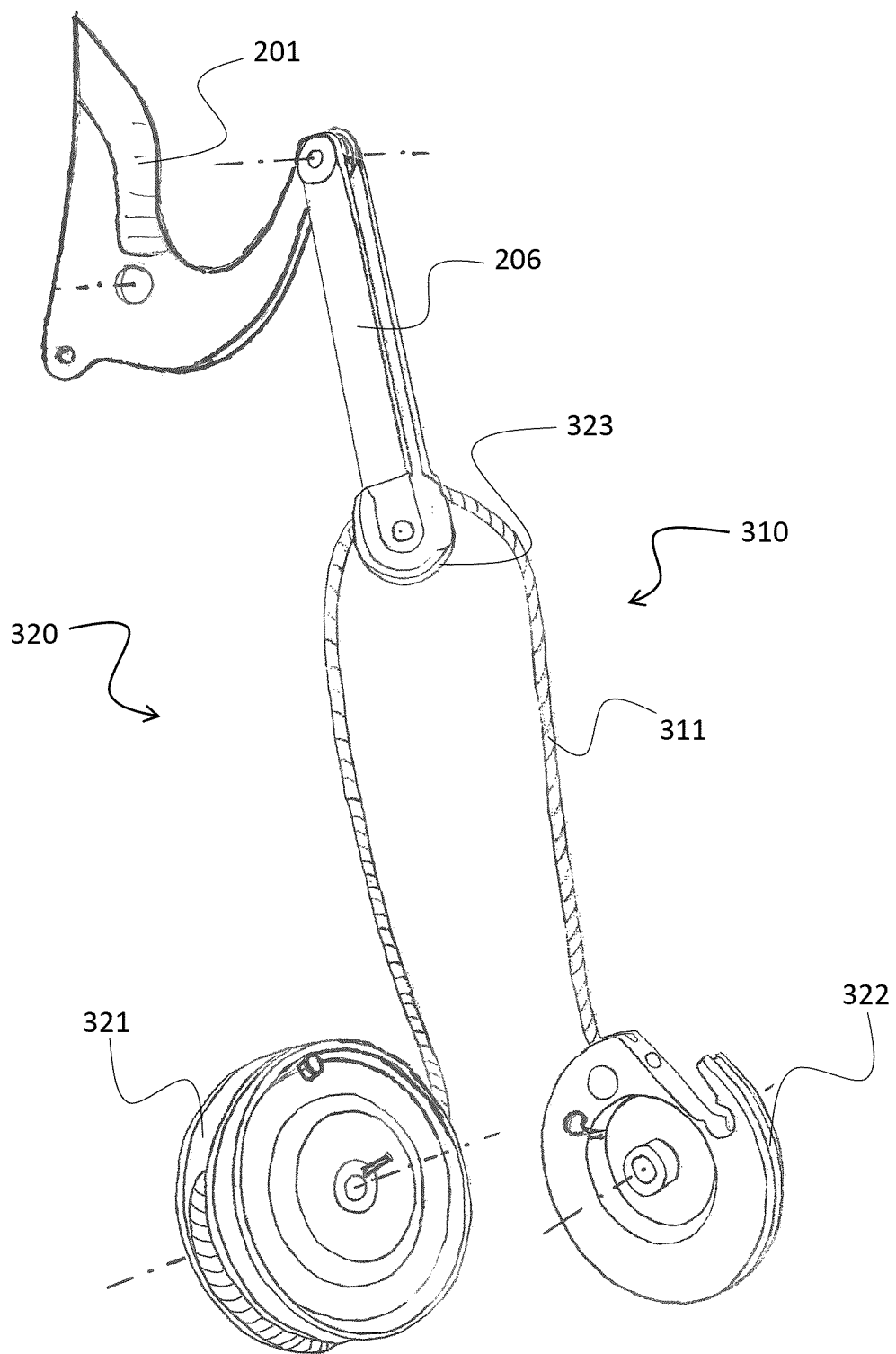
FIG. 8 shows an explosion view of a part of pruning shears according to an embodiment of the invention.
Figure 9:
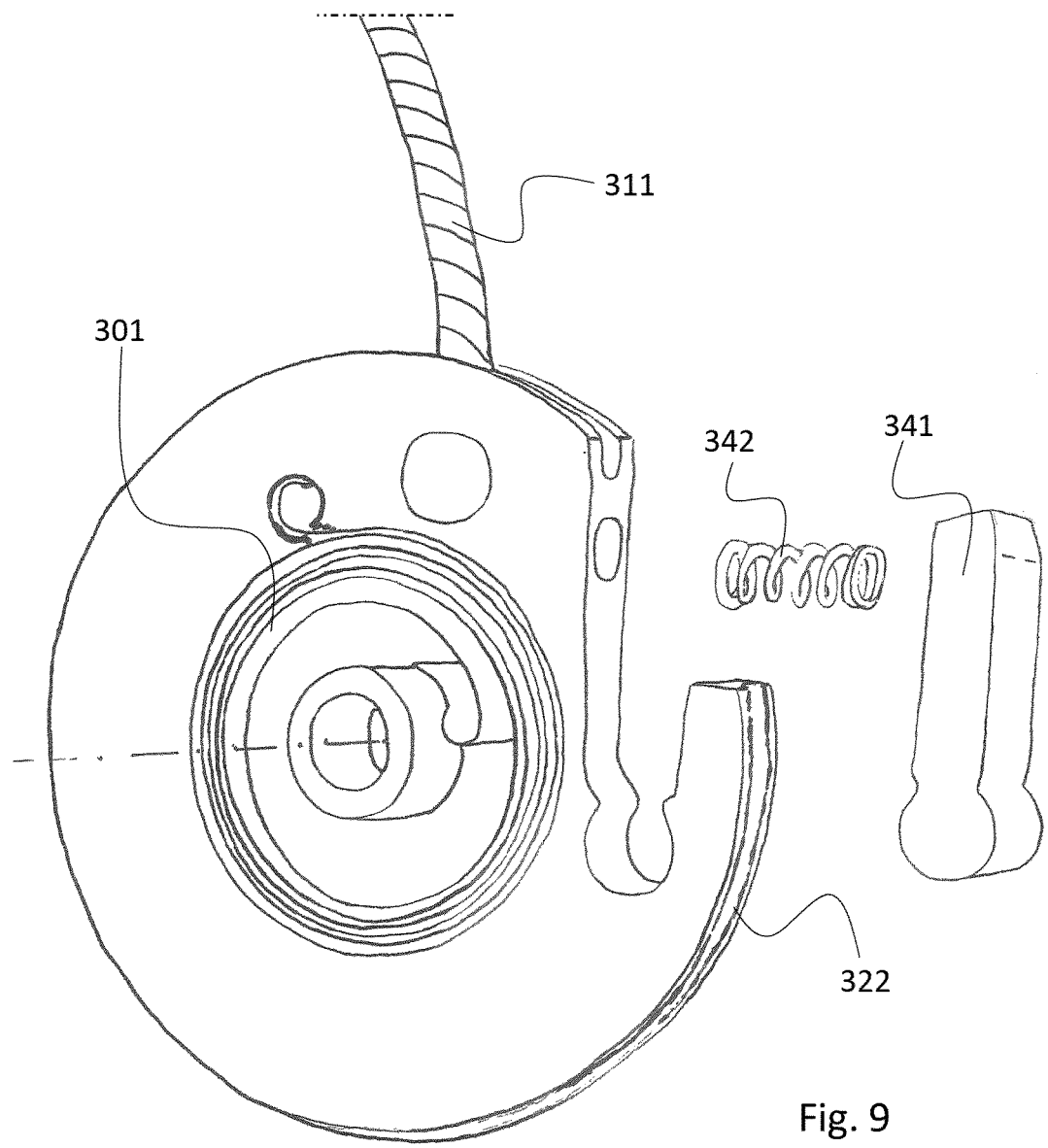
FIG. 9 shows an explosion view of a part of pruning shears according to an embodiment of the invention.

In this embodiment the sheave 323 is attached to a block 206, wherein the block 206 operates the blade 201. This arrangement is illustrated in FIG. 8. The driving line 311 pulling the block 206 is attached to the first pulley 321 and the second pulley 322. The arrangement is driven for example by a pull line 305 attached to the first pulley 321 and wound around the first pulley 321. The second pulley 322 is connected to the first pulley 321 via the spiral torsion spring 301 or via the part 302 and the counterpart 303, the part 302 and the counterpart 303 having an attractive magnetic force with each other. A pin acting as the stopper 304 locks the spring loaded pawl 341 so that the spring loaded pawl 341 is retracted. If the drive mechanism comprises a spiral torsion spring 301, the stopper prevents the second pulley 322 from rotating due the torsion from the spiral torsion spring 301, i.e. the prestress torque.

When a drawing torque is applied to the first pulley 321, for example by pulling the pull line 305, and there is no branch in the bight 203, the first pulley 321 and the second pulley 322 will rotate together thus winding the driving line 311 around the second pulley 322. When the blade 201 hits a branch the increased tension in the driving line 311 through the block 206 will pull the first pulley 321 and the second pulley 322 apart from their initial position relative to each other causing the spring loaded pawl 341 to engage a tooth 351 of the cover 350. The cutting continues then with an increased force to the block 206 and blade 201. If the diameters of the first pulley 321 and the second pulley 322 are equal at the both ends of the driving line 311 through the sheave 323, the force and the travel of the pull line 305 is doubled in the second mode having a large mechanical advantage compared to the force and the travel of the pull line 305 in the first mode having a small mechanical advantage.

Because the prestress torque is greater than the blade torque, the pull motion can be divided into two or more short strokes instead of one long pull. In that case the prestress torque tends to rotate the second pulley 322 so that the stopper 304 prevents the pawl 341 from engaging with one of the teeth 351. During the back and forth motion of the pull the blade 201 maintains its position because it is wedged into the branch to be cut and therefore the blade spring 204 does not pull the blade 201 into the starting position. This feature enables the user to find a more comfortable position for cutting in awkward positions on e.g. a ladder.

The invention claimed is:

1. Pruning shears comprising
a cutting head with a spring-biased blade pivotally connected to a jaw about a pivot point, the jaw cooperating with the blade to sever a workpiece received in a bight formed by the jaw; the spring-biased blade being biased with a blade force;
a drive mechanism connected to the cutting head; and
an elongate housing connected to the drive mechanism;
wherein the drive mechanism comprises a driving line arrangement comprising a driving line;
wherein the drive mechanism comprises a tackle arrangement, and the tackle arrangement comprises:
a first pulley rotatable relative to the drive mechanism about an axis and coupled to the blade;
a second pulley rotatable relative to the drive mechanism about the axis and arranged to receive the driving line at least partly around the second pulley; and
a sheave for supporting the driving line, the sheave being arranged so that the driving line runs from the second pulley at least partly around the sheave and at least partly around the first pulley;
wherein the driving line is arranged to transmit forces between the first pulley, the second pulley and the sheave; and the drive mechanism comprises a rotation prevention means for preventing rotation of the second pulley in relation to the drive mechanism when a drawing torque is applied to the second pulley, wherein the drawing torque is greater than a threshold torque, resulting in the second pulley being stationary in relation to the drive mechanism and the first pulley rotating in relation to the drive mechanism.

2. Pruning shears according to claim 1, wherein the drive mechanism comprises a cover in connection with the cutting head and the elongate housing, the cover being provided with teeth at the inner surface of the cover.

3. Pruning shears according to claim 2, wherein the rotation prevention means comprises a spring loaded pawl arranged at the second pulley, wherein the spring loaded pawl is arranged to engage with one of the teeth of the inner surface of the cover.

4. Pruning shears according to claim 1, wherein the diameter of the first pulley is smaller than the diameter of the second pulley.

5. Pruning shears according to claim 1, wherein the drive mechanism comprises a spiral torsion spring attached from one end to the second pulley and coupled from the other end to the first pulley, wherein:
the spiral torsion spring is prestressed with a prestress force;
a prestress torque to the first pulley caused by the prestress force is greater than a blade torque caused by the blade force; and
the prestress torque acts as the threshold torque.

6. Pruning shears according to claim 1, wherein the drive mechanism comprises a part attached to the second pulley, wherein:
the part has an attractive magnetic force with a counterpart, wherein the counterpart is coupled to the first pulley;
a magnetic torque to the first pulley caused by the magnetic force is greater than a blade torque caused by the blade force; and
the magnetic torque acts as the threshold torque.

7. Pruning shears according to claim 5, wherein the drive mechanism comprises a support wheel for supporting the sheave, the support wheel being rotatable relative to the drive mechanism about the axis and arranged between the first pulley and the second pulley, wherein:
the other end of the spiral torsion spring has been attached to the support wheel;
the drive mechanism comprises a stopper arranged to prevent the spring loaded pawl from engaging with one of the teeth of the inner surface of the cover when the drawing torque between the second pulley and the support wheel is smaller than the threshold torque, and arranged to prevent the second pulley from rotating in relation to the support wheel due to the prestress torque; and
the sheave is supported by the support wheel so that it guides the driving line between the first pulley and the second pulley so that the sheave reverses the winding direction of the driving line on the second pulley relative to the winding direction of the driving line on the first pulley.

8. Pruning shears according to claim 6, wherein the drive mechanism comprises a support wheel for supporting the sheave, the support wheel being rotatable relative to the drive mechanism about the axis and arranged between the first pulley and the second pulley, wherein:
the counterpart has been attached to the support wheel;
the drive mechanism comprises a stopper arranged to prevent the spring loaded pawl from engaging with one of the teeth of the inner surface of the cover when the drawing torque between the second pulley and the support wheel is smaller than the threshold torque; and
the sheave is supported by the support wheel so that it guides the driving line between the first pulley and the second pulley so that the sheave reverses the winding direction of the driving line on the second pulley relative to the winding direction of the driving line on the first pulley.

9. Pruning shears according to claim 7, wherein the stopper is arranged at the support wheel.

10. Pruning shears according to claim 1, wherein one end of the driving line has been attached to the second pulley, wherein the driving line runs counter-clockwise at least partly around the second pulley, via the sheave and clockwise at least partly around the first pulley.

11. Pruning shears according to claim 1, wherein the first pulley is coupled to the blade by a head line, the head line being connected to the first pulley at a first connecting point such that the head line is wound about a guiding surface of the first pulley as the first pulley rotates about the axis.

12. Pruning shears according to claim 1, wherein the driving line arrangement is arranged to rotate the first pulley and the second pulley when a drawing force is applied to the driving line, wherein the drawing torque is caused by the drawing force.

13. Pruning shears according to claim 5, wherein the drive mechanism comprises a stopper arranged to prevent the spring loaded pawl from engaging with the one of the teeth of the inner surface of the cover when the drawing torque between the first pulley and the second pulley is smaller than the threshold torque, and arranged to prevent the second pulley from rotating in relation to the first pulley due to the prestress torque.

14. Pruning shears according to claim 3, wherein the drive mechanism comprises a stopper arranged to prevent the spring loaded pawl from engaging with the one of the teeth of the inner surface of the cover when the drawing torque between the first pulley and the second pulley is smaller than the threshold torque.

15. Pruning shears according to claim 13, wherein the stopper is arranged at the first pulley.

16. Pruning shears according to claim 13, wherein:
the sheave is coupled to the blade;
the driving line has been attached to the second pulley; and
the driving line runs from the second pulley at least partly around the sheave and at least partly around the first pulley.

17. Pruning shears according to claim 13, wherein:
the driving line has been attached to the first pulley; and
the drive mechanism comprises a pull line arranged to rotate the first pulley when a drawing force is applied to the pull line, the pull line being arranged to rotate the first pulley in a direction where the driving line is wound around the first pulley, wherein the drawing torque is caused by the drawing force.

* * * * *